UNITED STATES PATENT OFFICE 2,444,013

ARYLAZOARYLGUANIDES

Jack T. Thurston, Riverside, Conn., assignor to American Cyanamid Company, New York, N. Y., a corporation of Maine No Drawing. Application August 24, 1943, Serial No. 499,829

1 Claim. (Cl. 260—153)

This invention relates to new azo dyestuffs and to new and useful methods of preparing the same.

The new azo dyes of the present invention, whose preparation is to be described and claimed herein, may be broadly designated as arylazoarylguanides. These compounds may be represented by the general formula:

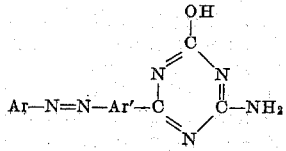

in which Ar and Ar' are aromatic radicals. Ar and Ar' may be the same, or different, type aromatic radicals and may have various types and kinds of substituent groups, as will be shown hereinafter. As will be seen from the structural formula of these compounds, they may also be designated as 2-hydroxy-4-amino-6-arylazoaryl-1,3,5-triazines.

Azo dyes having the above general formula may be prepared by diazotizing an aromatic substituted guanide, which contains an amino group on the aromatic substituent, and then coupling it with an aromatic coupling compound, containing an amino and/or hydroxyl group attached to the aromatic ring thereof, through the diazoic group of the diazotized guanide. Among the aromatic substituted guanides which may be diazotized and coupled with aromatic components to form new dyes are those such as: p-aminobenzoguanide, m-amino-benzoguanide, m-aminophenoxyacetoguanide, (3-amino-5-hydroxyphenyl)-stearoguanide, 3-aminophenoxydiethoxyacetoguanide, 4-amino-α-naphthoguanide, 5-amino-β-naphthoguanide, 2-(4'-aminobenzoyl)-benzoguanide, β-(4-aminobenzoyl)-propiono-guanide, m-amino-cinnamoguanide, 4-(4'-amino-2'nitrobenzoyl)-3-butene-o-guanide, and the like.

The diazotized amino aromatic substituted guanides such as those named above may be coupled with aromatic amino or hydroxy compounds capable of azoic coupling. By "aromatic" I mean any cyclic compound, whether carbocyclic or heterocyclic, having conjugated double bonds. Familiar compounds of this class are those belonging to the benzene, naphthalene, pyrazolone, carbazole, benzothiazole, 1,2,4-triazole, 3-hydroxyindole and other series. These compounds may be substituted with alkyl, aryl, cycloalkyl, halide, hydroxy, nitro, cyano, sulfo, sulfamido, carboxy, carbonyl, carbamyl, amino and other radicals as will appear from the specific compounds named below and from the specific illustrative examples.

Specific instances of suitable coupling compounds of these types are: the hydroxy benzenes and substituted hydroxy benzenes such as 1,3-dihydroxy benzene, 2,6-dihydroxybenzoic acid, 1,2,3,-trihydroxy benzene, guaiacol, m-nitrophenol, chlorophenols, naphthols, aminonaphthols, naphthol sulfonic acids, phenolsulfonic acids, etc.; the amino benzenes and substituted amino benzenes such as aniline, metanilic acid, dimethylaniline, diethylaniline, diethylaniline-m-sulfonic acid, ethylbenzylaniline, ethylbenzylaniline sulfonic acid, 1,3-diaminobenzene, ortho- and meta-toluidine, p-xylidine, 2,5-dihydroxyalkylaminobenzene, m-toluylene-diamine, phenylazoaniline, 3-amino-phenol-6-sulfonic acid, o-methoxyaniline, p-ethoxyaniline, ortho-aminobenzoic acid, etc.; the hydroxy and aminonaphthalenes such as α- and β-naphthols, α- and β-naphthylamines, the naphthylamine sulfonic acids, 1-naphthol-3-sulfonic acid, 1-amino-8-nitro-2-naphthol-4-sulfonic acid, 1,8-dihydroxynaphthalene-3,6-disulfonic acid, 1-chloro-8-napthol-3,6-disulfonic acid, 2-naphthol-7-sulfonic acid, 2-amino-8-naphthol-6-sulfonic acid, 2-naphthol-6,8-disulfonic acid, 2-acetylamino-5-naphthol-7-sulfonic acid, 2-N-β-hydroxyethylamino-8-naphthol-6-sulfonic acid, 1,8-aminonaphthol-3,6-disulfonic acid, 7-hydroxy-1-naphthyl-m-hydroxyphenylamine, etc.; the arylides of naphthoic acids as for example the benzidide of β-hydroxynaphthoic acid, 2-hydroxynaphthanilide, etc.; pyrazolones and pyrazyl pyrazolones such as 3-methyl-5-pyrazolone, 1-phenyl-3-methyl-5-pyrazolone, 1-(4'-sulfophenyl)-3-methyl-5-pyrazolone, 1-(2'-naphthyl)-3-methyl-5-pyrazolone-8'-sulfonic acid and the like; ortho- and meta-hydroxybenzoylguanylurea, o-hydroxyphenoxyacetylguanylurea, amino-hydroxybenzoylguanylurea, ortho- and meta-hydroxybenzoyldicyandiamide, o-hydroxy-phenoxyacetyldicyandiamide, amino-hydroxybenzoyldicyandiamide, etc.; arylides of acetoacetic acid such as diacetoacetictolidide, furoylacetic acid, hydroxydibenzothiophene carboxylic acids, etc.; and those condensation products of aryl amines with λ-hydroxymethane sulfonic acids such as specifically N-o-methylphenylaminomethanesulfonic acid, etc.

By selecting appropriate coupling components it is possible to prepare dyes having particular utility in dyeing fabrics of cellulosic fibers such as cotton, regenerated cellulose, cellulose esters and ethers, etc.; wool, silk, nylon and other natural and synthetic fibers. Guanides are normally acidic in character but the acidic —OH group on the triazine ring may be neutralized with an alkali or alkaline substance. Accordingly, dyes may be formed which are acidic, neutral or basic in character. They may be formed having solubilizing groups, such as sulfonic or carboxyl groups, or not, as desired. Some of the dyes may be metallized with copper, chromium, iron, manganese, cobalt, nickel, etc., and made more stable. For example, when the radicals Ar and Ar' each have hydroxyl groups, hydroxyl and carbonyl, hydroxyl and amino, or hydroxyl and carboxyl groups in ortho position to the azo bridge the dyes may be metallized. A typical metallizable dye of this type can be made by diazotizing p-amino-m-hydroxybenzoguanide and coupling it with β-naphthol-sulfonic acid in alkaline solution. The dyes of the present invention may also be employed in the preparation of printing inks, textile printing pastes, colored lacquers, colored plastic composition, for dyeing paper and in other related fields.

Since the aromatic guanides, as a class, are difficultly soluble in water, it is more convenient to prepare the arylazoarylguanide dyes from the more soluble arylazoaroylguanylureas. To prepare the arylazoarylguanide dyes in this manner, it is merely necessary to treat a desired arylazoaroylguanylurea with a dilute solution of an alkali at room temperature. During this treatment, the arylazoaroylguanylurea is converted to an arylazoarylguanide by cyclization of the acyl guanylurea proportion of the molecule. Preparation of representative arylazoaroylguanylureas and their conversion to arylazoarylguanides is illustrated in the specific examples which follow. Preparation of arylazoaroylguanylurea dyes is more fully disclosed and claimed in my co-pending application, Serial No. 488,891, filed May 28, 1943, now Patent No. 2,367,073, issued January 9, 1945.

The preparation of typical amino aromatic guanides and their diazotization and coupling to conventional coupling components will now be described in the following specific examples. It will be understood, of course, that other amino aromatic guanides may be diazotized and coupled to still other coupling components such as those previously named in like manner. Specific examples illustrating the conversion of arylazoaroylguanylureas to arylazoarylguanides in accordance with the preferred procedure of my invention will also be given. It should be understood, however, that my invention is not limited to the particular reactants or conditions disclosed in these specific examples since modifications obvious to those skilled in the art may be made therein without departing from the scope of my invention as set forth in the appended claim. All parts are by weight unless otherwise stated.

Example 1

185 parts of p-nitrobenzoyl chloride was dissolved in 396 parts of acetone and added to a cold mixture of 260 parts of 50% sodium hydroxide, 100 parts of dicyandiamide, 396 parts of acetone and 100 parts of water. The temperature was kept at 5-10° C. and the addition was complete in a half-hour. The mixture was then diluted with water, neutralized and filtered. The material was then purified by dissolving in an excess of potassium hydroxide solution and cooling, whereupon the potassium salt of p-nitrobenzoyldicyandiamide was precipitated. The acyl dicyandiamide was recovered from its salt by dissolving in water and neutralizing with hydrochloric acid.

955 parts of $Fe_2SO_4.7H_2O$ was dissolved in 1500 parts of water and the solution heated to refluxing temperatures with stirring. In the meantime 1250 parts of water was heated almost to boiling and 90 parts of concentrated ammonium hydroxide added followed by the addition of 100 parts of p-nitrobenzoylcyandiamide. This latter solution was added to the boiling ferrous sulfate solution and the mixture was made faintly alkaline by ammonium hydroxide (about 450 parts). Boiling was continued for 10 minutes and the mixture was then cooled in an ice bath. The solution was filtered to remove insoluble material which was extracted with dilute alkali to remove the p-aminobenzoyldicyandiamide contained therein. Upon neutralization of the alkaline solution p-aminobenzoyldicyandiamide was obtained as a pale yellow material decomposing when heated at 235–237° C.

Twenty parts of p-aminobenzoyldicyandiamide obtained by reduction of p-nitrobenzoyldicyandiamide with ferrous sulfate as described above was treated with 200 parts of 2% hydrochloric acid at room temperature for one hour. The insoluble matter was filtered and the solution neutralized with dilute ammonium hydroxide to a pH of about 5.0. The precipitate of p-aminobenzoylguanylurea was boiled for a short time with a slight excess of 10% hydrochloric acid to insure complete conversion of the p-aminobenzoyldicyandiamide to p-aminobenzoylguanylurea. The latter product was recovered by filtering the precipitate obtained upon neutralizing the solution with ammonium hydroxide as before. Upon recrystallization from a methanol-water mixture a colorless product was obtained which decomposed at 178–180° C.

22.1 parts of p-aminobenzoylguanylurea was dissolved in 150 parts by weight of 10% hydrochloric acid. A solution of 6.9 parts of sodium nitrite in 50 parts of water was added slowly to the above at 3 to 5° C. until the theoretical amount of sodium nitrite had been added. After stirring for about 15 minutes sufficient sodium sulfamate was added so that a sample of the reaction mixture gave only a faintly positive reaction to the starch-potassium iodide test. 9.3 parts of aniline was then added to the reaction mixture followed by the addition with stirring of 32.8 parts of sodium acetate. A bright orange arylazoaroylguanylurea dye formed immediately.

The insoluble arylazoaroylguanylurea dye prepared as just described was suspended in a 5% solution of caustic soda and allowed to stand with occasional agitation for one hour. During the course of this time, the suspension became a darker red as formation of arylazoarylguanide took place. The resulting dark red guanide dye was believed to have the following formula:

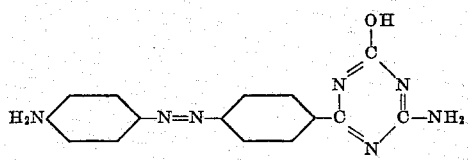

Example 2

Thirty-five parts of p-aminobenzoylguanylurea, prepared as described in the preceding example, was dissolved in 200 parts by weight of a 5% solution of sodium hydroxide and allowed to stand for 75 minutes. Upon neutralization of the solution with dilute hydrochloric acid, p-aminobenzoguanide was precipitated. The white flocculent material was slightly soluble in hot water and after one recrystallization from water, sintered without completely melting on heating to 320–325° C. Upon diazotizing the p-aminobenzoguanide and coupling it with aniline as in the preceding example, a dark red arylazoarylguanide dye stuff having the same structural formula as that illustrated in the preceding example is obtained.

Example 3

Thirty parts of the arylazoaroylguanylurea dye prepared as described in Example 1 was suspended in 150 parts of 10% HCl. The suspension was cooled in an ice bath and the dye further diazotized by the addition of a solution of 6.9 parts of sodium nitrite in 50 parts of water. As the nitrite solution was added, the original pink suspension became brown and much thinner. The excess nitrous acid was then destroyed with sodium sulfamate. 9.5 parts of dimethyl aniline and 32.8 parts of sodium acetate were then added to the reaction mixture. A deep red guanylurea dye formed at once. The suspension was then filtered, washed and suspended in a 5% solution of sodium hydroxide and allowed to stand with occasional agitation for one hour. During this time, a red dye of a deeper color having the following structural formula was formed.

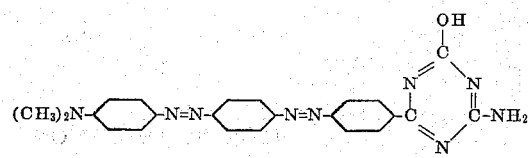

Example 4

Twenty-five parts of p-aminobenzoyldicyandiamide was dissolved in a solution of 54 parts of 10% sodium hydroxide and 100 parts of water and poured slowly with stirring into a water-acid solution containing 235 parts of 10% hydrochloric acid and 900 parts of water at 5° C. A solution of 12 parts of sodium nitrite in 100 parts of water was added slowly to the above until the theoretical amount of sodium nitrite had been added, i. e., about 60 parts of the sodium nitrite solution. After 20 minutes a small amount of dilute sodium sulfamate solution was added until a sample of the reaction mixture was negative to the starch-potassium iodide test.

The neutralized solution was then poured into a solution containing 17.4 parts of β-naphthol, 54 parts of 10% sodium hydroxide and 41.2 parts of sodium carbonate in 1000 parts of water. After 4 to 5 hours of stirring, the red dye which had precipitated out was filtered, washed and vacuum dried. 10 parts by weight of the dried product was treated with an equal weight of concentrated hydrochloric acid at room temperature for about 10 minutes. The reaction mixture was then diluted with water and filtered. The product was believed to have the following structure:

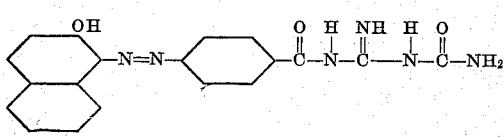

An aqueous suspension of the dye has a dull red color and was only slightly soluble in dilute hydrochloric acid.

When a portion of the guanylurea dye just described was suspended in a dilute solution of sodium hydroxide, the arylazoaroylguanylurea changed to an arylazoarylguanide with the formation of a red precipitate within about 10 minutes. This guanide dye had the following formula:

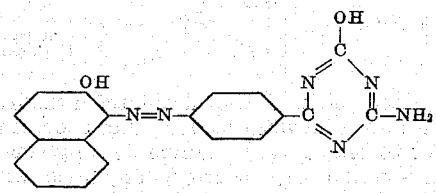

This compound was slightly soluble in alkali but was not soluble in dilute acids.

Example 5

Twenty parts of m-hydroxyphenoxyacetyldicyandiamide was boiled for 3 or 4 minutes with an excess of 10% hydrochloric acid. The acyl dicyandiamide dissolved readily. After filtering a trace of gum-like material from the heated liquid it was cooled whereupon the hydrochloride salt of m-hydroxyphenoxyacetylguanylurea was precipitated. The free base was recovered from the hydrochloride as a white crystalline solid by carefully neutralizing the solution of the salt with dilute ammonium hydroxide.

A solution of 20 parts of m-hydroxyphenoxyacetylguanylurea in 3% solution of sodium hydroxide was allowed to stand at room temperature for one-half hour. The solution was then carefully neutralized with dilute acetic acid and m-hydroxyphenoxyacetoguanide was obtained as a flocculent white precipitate. The product was slightly soluble in hot water and a recrystallized portion of the compound decomposed at 235–240° C.

m-Nitroaniline was diazotized by suspending 15.8 parts of m-nitro aniline in 236 parts of 10% hydrochloric acid and adding 7.5 parts of solid sodium nitrite to the suspension cooled at 5° C. A clear solution resulted.

Addition of the diazonium solution to a slightly alkaline solution containing 22.5 parts of m-hydroxyphenoxyacetoguanide results in the formation of a red colored dye having the general formula:

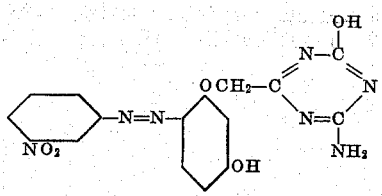

In addition to these many other dyes of different kinds and colors may be prepared as described in the foregoing examples. As will be apparent from the foregoing, I may prepare my new dyes by any one of several methods. A suitable aminoaryl substituted guanide may be diazotized and then coupled with one of a large number of different types and kinds of coupling components. On the other hand, I may couple an amino or hydroxy aryl substituted guanide to a wide variety of diazotized aromatic compounds.

A few such dyes, in addition to the above, that I have prepared are given in the following table.

| Diazo Component | Coupling Component | Color |
| --- | --- | --- |
| p-aminobenzoguanide | citrazinic acid | Brown. |
| Do | 1 phenyl-3-methyl-5-pyrazolone. | Orange-brown. |
| m-aminobenzoguanide | 2-hydroxynaphthanilide | Dark-red. |
| Do | 1 amino-8-hydroxy-3,6-disulfonaphthalene. | Scarlet-red. |
| 2,5-dichloroaniline | m-hydroxypheonoxyacetoguanide. | Red. |
| p-aminoacetanilinide | ___do___ | Reddish-brown. |
| benzidine | ___do___ | Dark-red. |

As noted before, the aromatic substituted guanides are difficultly soluble and, accordingly, I prefer to prepare my guanide dyes by treating the more soluble arylazoaroylguanylureas with a solution of an alkaline material whereby the acyl guanylurea group is cyclized to form the guanide nucleus. During this cyclization the arylazoaryl portion of the molecule remains unchanged and as a result I obtain from the arylazoaroylguanylurea the corresponding arylazoarylguanide dye.

In general, any alkaline material having a dissociation constant of about $1 \times 10^{-6}$ and which is sufficiently soluble in a solvent for the arylazoaroylguanylurea so that it is able to form a salt therewith may be employed to convert arylazoaroylguanylureas to corresponding arylazoarylguanides. Among such alkaline materials may be specifically mentioned; sodium hydroxide, sodium carbonate, sodium bicarbonate, potassium carbonate, ammonium hydroxide, monoethanolamine, sodium ethylate, benzylamine, dimethylamine, piperidine, morpholine, and many other organic and inorganic alkaline materials. The amount of alkaline substance employed should preferably be enough to dissolve the arylazoaroylguanylurea. A solution containing approximately an equimolecular portion of the acylguanylurea and alkali is ordinarily employed.

The conditions of the reaction whereby the arylazoaroylguanylureas are converted to arylazoarylguanides may vary considerably as to time and temperature. At temperatures corresponding to the refluxing temperature of the solution, the cyclization may be substantially complete within 2 or 3 minutes. On the other hand, at very low temperatures, the reaction may require as long as 5 hours. The strength and concentration of the alkali employed will also affect the speed of the reaction. Ordinarily, no harm is done if the reaction period is extended beyond the time necessary for complete cyclization.

As pointed out hereinbefore, the —OH group attached to the triazine ring of the guanide nucleus is acidic in character and will form salts with alkalies. Such salts are more water soluble than the free guanide but may be recovered from solution and used as such if desired. To recover the arylazoarylguanide in its free state it is merely necessary that the solution containing the reaction product be neutralized with an acid. The free guanide being more insoluble is precipitated from solution and may be recovered by filtration and further purified if desired.

In addition to alkali-metal salts, I may also prepare other metal salts of arylazoarylguanides. These metal salts are advantageously prepared and used in cases where dyes having particular shades are desired. These dyes also have the advantage, in most cases, of being more resistant to soaping when the dyed fabric is washed. Salts of such heavy metals as copper, chromium, cobalt, nickel, iron, mercury, aluminum, magnesium, tin, etc., may be prepared, preferably by double decomposition. By this method an alkali-metal arylazoarylguanide salt is first prepared by treatment of the guanide dye with sodium or potassium hydroxide. The resulting alkali-metal salt is then treated with a metal salt of an acid such as, for example, copper chloride, nickel sulfate, cobalt nitrate, etc., whereby the sodium or potassium ion is replaced with the ion of another metal.

I claim:

Azo dyestuffs of the general formula:

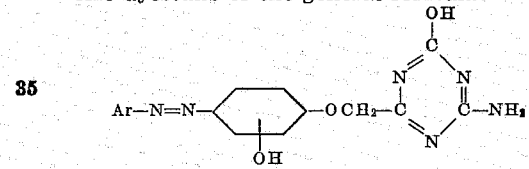

in which Ar is an aromatic radical.

JACK T. THURSTON.

REFERENCES CITED

The following references are of record in the file of this patent:

UNITED STATES PATENTS

| Number | Name | Date |
| --- | --- | --- |
| 1,625,532 | Fritzche et al. | Apr. 19, 1927 |
| 1,625,533 | Fritzche et al. | Apr. 19, 1927 |
| 1,667,312 | Fritzche et al. | Apr. 24, 1928 |
| 2,310,004 | Widmer et al. | Feb. 2, 1943 |

FOREIGN PATENTS

| Number | Country | Date |
| --- | --- | --- |
| 221,843 | Great Britain | Sept. 17, 1924 |
| 242,867 | Great Britain | Nov. 19, 1925 |
| 543,112 | Germany | Feb. 1, 1932 |